United States Patent
Abraham et al.

[15] 3,694,725
[45] Sept. 26, 1972

[54] STEPPING MOTOR CONTROL SYSTEM USING PULSE INJECTION

[72] Inventors: Dennis G. Abraham, Vestal; Joseph P. Pawletko, Endwell, both of N.Y.

[73] Assignee: International Business Machines Corporation, Armonk, N.Y.

[22] Filed: Dec. 29, 1969

[21] Appl. No.: 888,704

[52] U.S. Cl. ................................. 318/685, 318/254
[51] Int. Cl. .................................................. H01k 37/00
[58] Field of Search ....... 318/20.260, 20.250, 20.310, 318/130, 254, 696, 685, 254, 138

[56] References Cited

UNITED STATES PATENTS

| | | | |
|---|---|---|---|
| 3,112,433 | 11/1963 | Fairbanks | 318/696 X |
| 3,328,658 | 6/1967 | Thompson | 318/696 |
| 3,374,410 | 3/1968 | Cronquist et al. | 318/685 X |
| 3,176,208 | 3/1965 | Gifft | 318/20.320 |
| 3,370,289 | 2/1968 | Hedgcock et al. | 318/20.260 |
| 3,378,741 | 4/1968 | Sutton | 318/20.260 |
| 3,458,786 | 7/1969 | Thompson | 318/20.620 |
| 3,482,155 | 12/1969 | Fredriksen | 318/20.320 |
| 3,518,516 | 6/1970 | Pawletko | 318/138 |
| 3,593,096 | 9/1971 | Newell | 318/696 |

*Primary Examiner*—G. R. Simmons
*Attorney*—Hanifin and Jancin and Paul M. Brannen

[57] ABSTRACT

Single step operation of a stepping motor and deceleration of the stepping motor utilized in a closed-loop mode are obtained utilizing a pulse injection arrangement in which a suitable plurality of pulses are supplied in rapid succession to the drive circuits for the stepping motor in order to quickly step the magnetic fields to the proper condition at a rate too fast for the rotor to follow.

5 Claims, 5 Drawing Figures

INVENTOR.
DENNIS G. ABRAHAM
JOSEPH P. PAWLETKO

BY

AGENT

STEPPING MOTOR CONTROL SYSTEM USING PULSE INJECTION

FIELD OF THE INVENTION

This invention relates generally to stepping motor control systems and in particular to a stepping motor control system utilizing pulse injection techniques for obtaining improved deceleration and single step operation of a stepping motor.

DESCRIPTION OF THE PRIOR ART

Reduction of oscillation in the deceleration of stepping motors and in the single step operation of stepping motors has been obtained in the past by use of means such as viscous mechanical damping, and electrical circuitry which, for example, can operate to reverse the direction of the operating fields of the motor at appropriate times and rates to effect the stopping. However, these prior arrangements require either the use of additional mechanical components in the system, which tend to degrade the operation of the system from other standpoints, or require the use of a relatively large number of additional circuit components to provide the circuit operation required.

SUMMARY OF THE INVENTION

It is a principal object of the present invention to provide an improved control system for stepping motors to provide improved deceleration and single step operating characteristics.

A more particular object of the present invention is to provide pulse injection means for providing a rapid sequence of pulses to the operating circuits of a stepping motor in order to rapidly advance the operating fields to their desired condition to provide the necessary deceleration or single step operation.

Still another object of the present invention is to provide an arrangement for generating a negative torque for decelerating a stepping motor system of the closed-loop type without requiring reversal of the polarity of the directional control line.

Still another object of the present invention is to provide an operating system for stepping motors for decelerating a motor or for operating it in a single step mode which utilizes only a small number of circuit components.

Other objects of the invention and features of novelty and advantages thereof will become apparent from the detailed description to follow, taken in connection with the accompanying drawings.

In practicing the invention, the drive circuits for the stepper motor are governed by circuits arranged so that at an appropriate time, a rapid sequence of pulses are supplied to the drive pulse generating circuitry, thereby rapidly advancing the sequence of operation of the drive windings of the motor. This pulse injection takes place at a rate such that the mechanical inertia of the system renders the rotor unable to follow this sequence, and as a result, when the sequence is terminated, the field will be in appropriate condition for causing either the deceleration of the system or the single step operation of the system as provided by the appropriate embodiment.

GENERAL DESCRIPTION OF THE DRAWINGS

Figure 4:
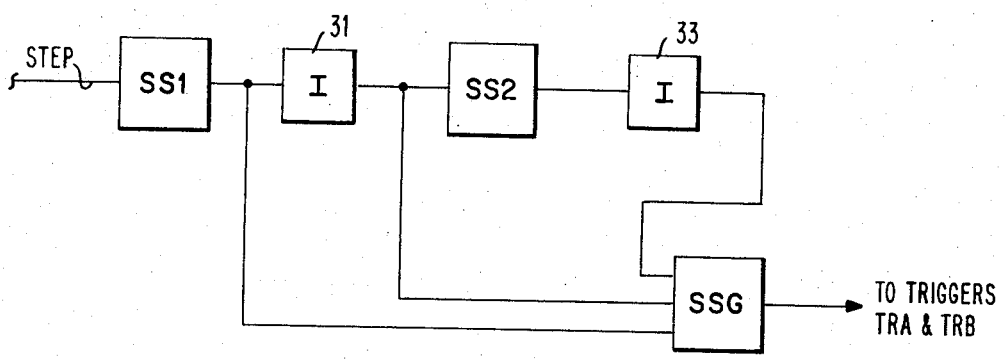
FIG. 4 is a fragmentary diagrammatic view illustrating the manner in which another preferred embodiment of the invention is utilized to provide single step operation of a stepping motor without overshoot.
Figure 5:
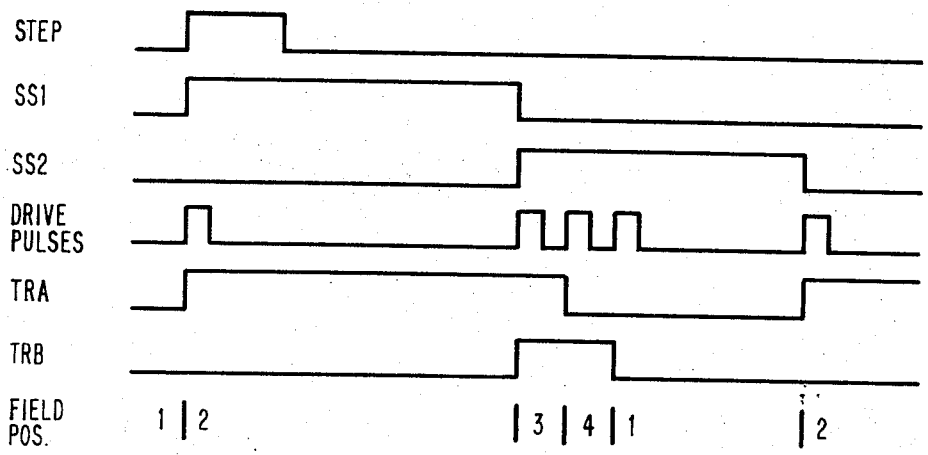

FIG. 5 of the drawings is a diagrammatic waveform illustration showing the manner in which the circuitry of FIG. 4 operates to provide the single step sequence.

DESCRIPTION OF THE FIRST PREFERRED EMBODIMENT

Figure 1:
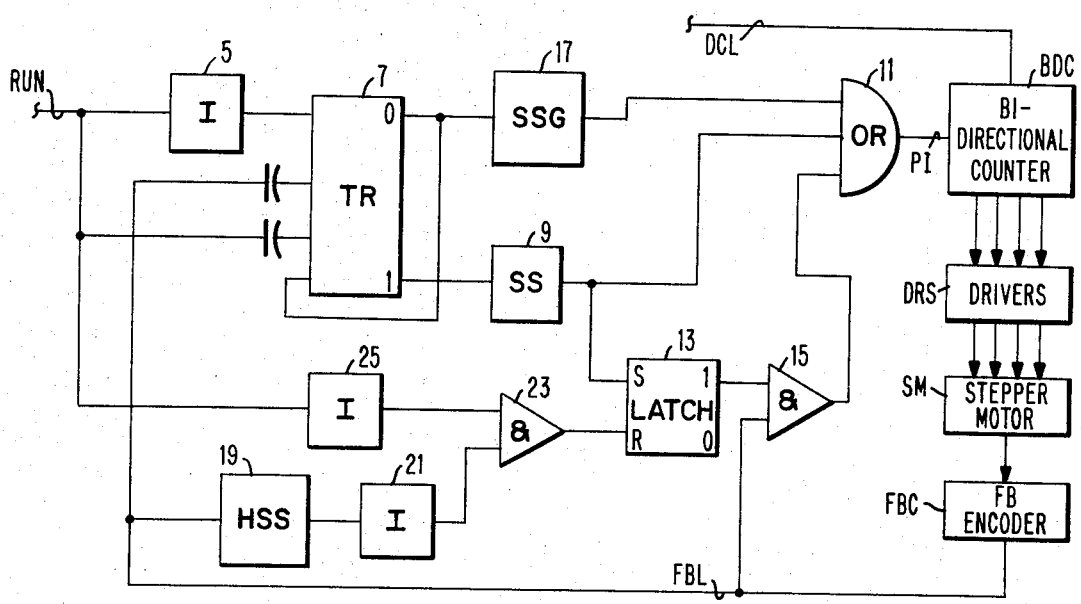
FIG. 1 is a diagrammatic illustration of a stepping motor control system including one preferred embodiment of the present invention, arranged to provide an improved decelerating operation of the system.

Referring now to FIG. 1 of the drawings, there is shown in schematic form a stepping motor control circuit comprising a first embodiment of the invention. As may be found in known stepping motor control circuits, the system includes a plurality of Driver Circuits DRS, arranged to supply pulses of energy of sufficient magnitude and proper phase relationship to the windings of a conventional Stepper Motor SM, under the control of the outputs of a Bi-directional Counter BDC. The Bi-directional Counter BDC has a Direction Control Line DCL, which determines the direction in which the count sequence shall occur on the output signal lines to the drivers, and also includes a Pulse Input Line PI, which determines the occurrence of the outputs. The Stepper Motor SM, of the conventional type drives a suitable utilization shaft, not shown, to which is attached a Feedback Encoder FBC, which may be of any suitable type, such as a photoelectric variety, which supplies feedback pulses on a line designated as FBL.

All of the foregoing apparatus and arrangement is conventional and well-known in the art, and it is deemed unnecessary to describe the apparatus in any further detail for this particular portion of the circuitry.

In operation, when the line designated RUN is energized at some positive potential, an inverted signal is passed by an Inverter 5 to a Run Trigger 7, which is thereby set ON. The ON output from Trigger 7 is supplied to a Single Shot 9, the output of which is supplied through OR Circuit 11 and the Line PI to Bi-directional Counter BDC. This start pulse will initiate the operation of the Bi-directional Counter BDC, which as usually constituted, includes a pair of cross-connected triggers, not shown, and generally designated as TRA and TRB, which operate to supply sequences of output pulses, four in number, the sequence of the pulses determining the direction of operation of the stepper motor. The initial start pulse causes an output to be supplied to the Stepper Motor SM with the result that the Feedback Coder FBC will supply a feedback pulse signal on the Line FBL. A Feedback Gate Latch 13 having been previously set by the output of the Single Shot 9, the AND Circuit 15 will supply the pulses from the Line FBL to the OR Circuit 11 and thence, to the Line PI governing the Bi-directional Counter BDC. Accordingly, the feedback pulses will be supplied through the feedback loop and continue to run the Stepper Motor SM.

When the RUN Line Signal drops the RUN Trigger 7 is reset by the next pulse on the Line FBL, which is capacity coupled to Trigger 7. Trigger 7 having been reset to its initial condition supplies a signal to the Decelerate Sequence Signal Generator 17. This signal generator, when enabled, fires a rapid sequence of three pulses into an output line which is supplied to the OR Circuit 11. The details of the decelerate sequence generator are not shown, but it may comprise a suitable ring circuit or any other type of conventional circuitry which will supply an output comprising a rapid sequence of three pulses, upon the supply to the generator of a suitable control signal. Three pulses supplied from the Decelerate Sequence Generator 17 to the bi-directional counter via OR Circuit 11 on Line PI are fed into the Drivers DRS and thence, into the operating fields of the Stepper Motor SM. These three pulses force the stepper motor field ahead so that the resultant field actually lags the normal position of the field. The result is a negative torque which causes the Stepper Motor SM to decelerate. Such deceleration causes an increasing separation in the pulses supplied by the Feedback Coder FBC to the Line FBL. When these have a wide enough time between them, the Holdover Single Shot 19 times out, and via the Inverter 21 supplies one input to AND Circuit 23, the other input of which is supplied from the RUN Line via an Inverter 25. The resultant output of AND circuit 23 causes the resetting of Latch 13, which blocks the supply of any further feedback pulses to the Bi-directional Counter BDC. The stepping motor will then be stopped.

Figure 2:
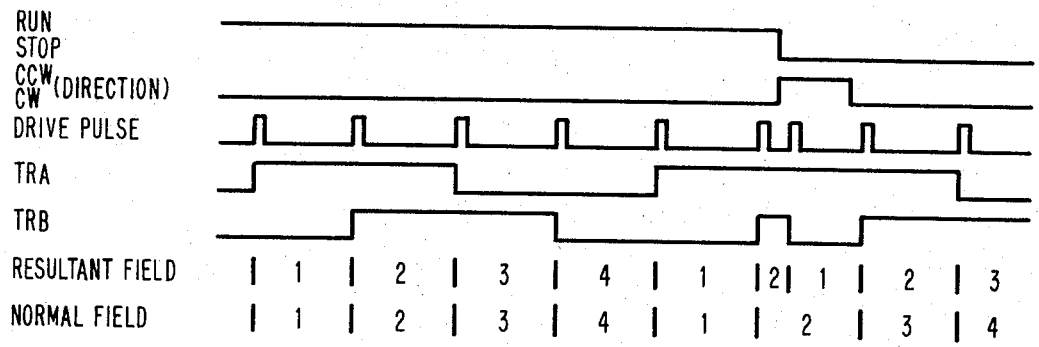
FIG. 2 is a diagrammatic waveform illustration showing the manner of operation of previously-known systems which reverse the direction line for a single count in order to provide the negative torque required for deceleration.

FIG. 2 is illustrative of the operation of prior systems in which the directional control line is momentarily reversed in order to provide a deceleration pulse. As illustrated in FIG. 2, with the RUN Line at an up level and the direction line down, the drive pulses cause the alternate operation of Triggers A and B, in the counter, to provide the field sequences shown at the bottom of the figure. When it is desired to stop the stepping motor, the RUN Line level is dropped as shown, and the directional control line is reversed for a short interval. This causes an additional drive pulse to be supplied within a short interval to the bi-directional counters, causing Trigger B to go through a short ON cycle. This causes the field sequence to depart from its normal manner and, as shown in the resultant field operation, an extra field advance pulse is provided so that the resultant field comes out at one step behind the normal field sequence.

Figure 3:
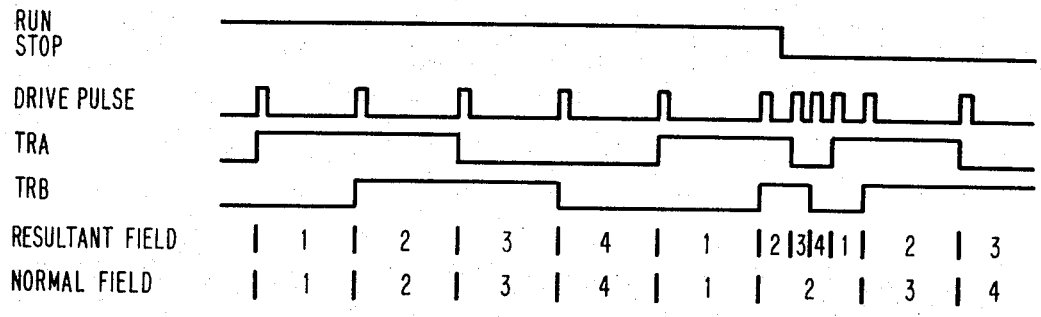
FIG. 3 is a diagrammatic waveform illustration illustrating the operation of the present invention, which does not require reversal of the directional control.

In FIG. 3, the operation of the present system is illustrated, in which the energization of the directional control line is not required. When the RUN Line drops, the three pulses are quickly injected by the stepping signal generator as shown in the diagram, causing operation quick succession of triggers TRA and TRB to thereby rapidly advance the field through its sequence so that the resultant field again finds itself displaced one position behind the normal field progression.

DESCRIPTION OF THE SECOND PREFERRED EMBODIMENT

FIG. 4 illustrates, in fragmentary form, the logic arrangement for single step operation of a stepping motor control system utilizing a counter comprising the conventional pair of Triggers TRA and TRB. When a command for a single step is given by provision of a signal on the Line STEP, the Single Shot SS1 fires and causes a single pulse to be emitted. The pulse governs the Stepping Sequence Generator SSG so as to cause a single pulse to be supplied therefrom to the Stepping Motor Drive Triggers TRA and TRB. This causes the stepping motor to advance. When approximately one-half of its travel has been completed, the Single Shot SS1 times out and as a result of the inverted pulse supplied through an Inverter 31, the Single Shot SS2 is fired at the same time. Also, the Stepping Sequence Generator SSG causes three pulses to be emitted therefrom to the Triggers TRA and TRB, the result of which is that the field is placed in a position to produce a negative torque on the rotor because the field is rapidly-stepped three positions in advance of the rotor position. This has the effect of slowing down the rotor and moving it into its final position. When it arrives at its final position, the Single Shot SS2 has had sufficient time to time out and, via an Inverter 33, a single pulse is emitted from Stepping Sequence Generator SSG. This single pulse will place the field in its equilibrium position again.

FIG. 5 illustrates the sequence of operation for the conditions described above. The single step signal is shown as causing sequential operation of the Single Shots SS1 and SS2, and it will be noted that when SS1 times out and SS2 turns on that three pulses are emitted to rapidly drive the Triggers TRA and TRB ahead so that the stator field is in the proper condition to cause the deceleration of the rotor. When SS2 times out, the drive triggers are placed in their equilibrium condition.

From all the foregoing, it will be apparent that the present invention provides a novel method for controlling deceleration or single step operation of a stepping motor by providing the rapid injection of a sufficient number of pulses to cause the operating fields to rapidly step in the desired sequence, which causes a negative decelerating or stopping torque to be applied to the rotor of the stepping motor.

While the invention has been particularly shown and described with reference to preferred embodiments thereof, it will be understood by those skilled in the art that the foregoing and other changes in form and details may be made therein without departing from the spirit and scope of the invention.

What is claimed is;
1. A stepping motor control system comprising, in combination,
   a. bi-directional counter means responsive to serially-supplied input pulses on a pulse input line for providing motor control output pulses in predetermined sequence for sequentially energizing the driver circuits for a stepping motor,
   b. first control means connected to the pulse input line of said counter means for governing the operation of said counter means for supplying motor control output pulses at a first normal running frequency, comprising feedback means governed by the operation of said stepping motor for supplying pulses at said first normal running frequency to the pulse input line of said bi-directional counter, and c. deceleration control means connected to said counter means and effective at times to govern the operation of said counter means to supply a plurality of motor control output pulses at a second frequency substantially higher than said first frequency, said plurality of second frequency pulses occurring at a rate and number such that said counter means advances the driver circuits at a rate greater than the mechanical response time of the stepping motor, to energize said motor in a deceleration mode.

2. A stepping motor control system as claimed in claim 1, further including timing means connected to said feedback means effective to govern the time during which said signal generator means is effective.

3. A stepping motor control system as claimed in claim 1, further including means governed by said first control means for initiating the operation of said stepping motor and maintaining the operation of said motor by feedback signals supplied from said feedback means.

4. A stepping motor control system as claimed in claim 3, further including timing means connected to said feedback control means for disabling the control of said counter by said feedback means when the time between feedback pulses exceeds a predetermined amount.

5. A stepping motor control system as claimed in claim 3, in which said timing means is effective to control said feedback means only when said first control means is ineffective to control said counter means.

* * * * *